(12) United States Patent
Malevergne

(10) Patent No.: US 7,730,918 B2
(45) Date of Patent: Jun. 8, 2010

(54) VEHICLE RIM INTENDED FOR MOUNTING A TIRE AND A BEARING SUPPORT AND MOUNTING PROCESS FOR A TIRE/WHEEL ASSEMBLY PROVIDED WITH SUCH A RIM

(75) Inventor: Michel Malevergne, Cebazat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 482 days.

(21) Appl. No.: 11/783,412

(22) Filed: Apr. 9, 2007

(65) Prior Publication Data
US 2007/0245562 A1 Oct. 25, 2007

Related U.S. Application Data

(60) Provisional application No. 60/809,790, filed on Jun. 1, 2006.

(30) Foreign Application Priority Data
Apr. 21, 2006 (FR) .................................. 06 03538

(51) Int. Cl.
*B60C 15/02* (2006.01)
(52) U.S. Cl. .................. 152/379.5; 152/381.4; 152/520
(58) Field of Classification Search ............. 152/379.3, 152/379.4, 379.5, 381.3, 381.4, 516, 520
See application file for complete search history.

(56) References Cited

U.S. PATENT DOCUMENTS 5,787,950 A 8/1998 Muhlhoff et al.
6,035,913 A * 3/2000 Bapt et al. ................ 152/381.4
6,415,839 B1 7/2002 Pompier et al.
6,609,549 B2 * 8/2003 Abinal et al. ................ 152/400
7,309,110 B2 * 12/2007 Vernet et al. ........... 301/95.102
7,438,099 B2 * 10/2008 Chardin et al. .............. 152/158

(Continued)

FOREIGN PATENT DOCUMENTS

DE 38 09 422 10/1989

(Continued)

*Primary Examiner*—Russell D Stormer
(74) *Attorney, Agent, or Firm*—Buchanan Ingersoll & Rooney PC

(57) ABSTRACT

A vehicle rim, of revolution, intended for mounting a tire and an annular bearing support capable of supporting a tread of the tire in the event of a loss of inflation pressure from the tire. This rim includes a first and a second rim seat, each intended to receive a bead of the tire. Each of the rim seats has a generatrix the axially inner end of which is on a circle of diameter $D_I$ greater than the diameter $D_E$ of the circle on which the axially outer end is located. The first rim seat is delimited axially to the inside by a protrusion, the external diameter $D_S$ of which is greater than the mean diameter $D_P$ of a supporting bearing surface of the rim. The supporting bearing surface is formed of at least one substantially cylindrical surface of revolution of mean diameter $D_P$ extending axially between the two seats and intended to be in close contact with the bearing support. A circumferential groove is located axially between the supporting bearing surface and the first rim seat, the axial width $L_G$ of the groove being adapted to permit the support to pass over the protrusion.

5 Claims, 8 Drawing Sheets

U.S. PATENT DOCUMENTS

| | | | |
|---|---|---|---|
| 2003/0098109 A1 | 5/2003 | Bouvier et al. | |
| 2003/0201045 A1* | 10/2003 | Adams | 152/158 |
| 2004/0074610 A1 | 4/2004 | Abinal | |
| 2005/0211352 A1* | 9/2005 | Ishida et al. | 152/158 |

FOREIGN PATENT DOCUMENTS

| | | |
|---|---|---|
| EP | 1 325 819 | 7/2003 |
| FR | 2 776 963 | 10/1999 |
| WO | WO 01/08905 | 2/2001 |

* cited by examiner

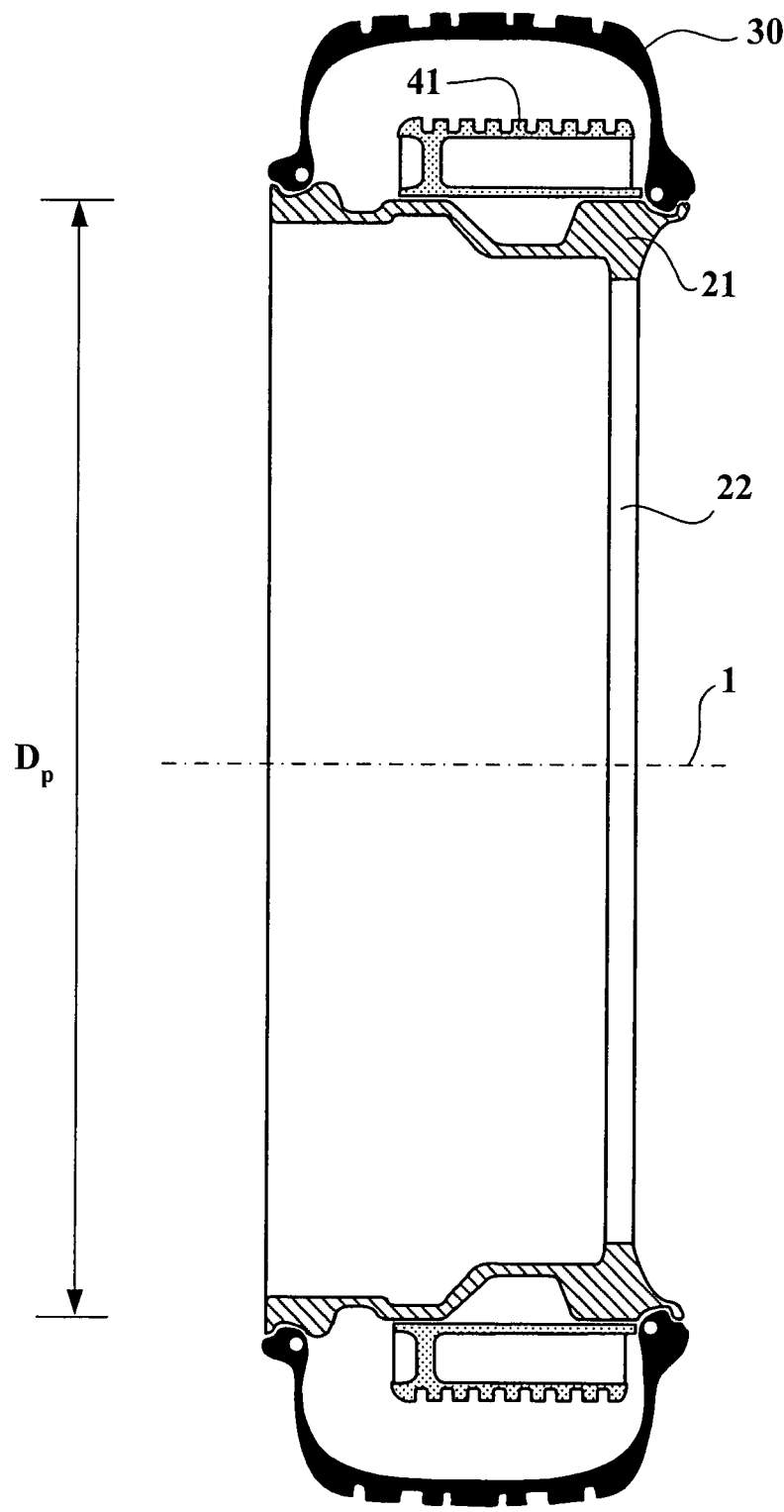
FIG. 2 - PRIOR ART

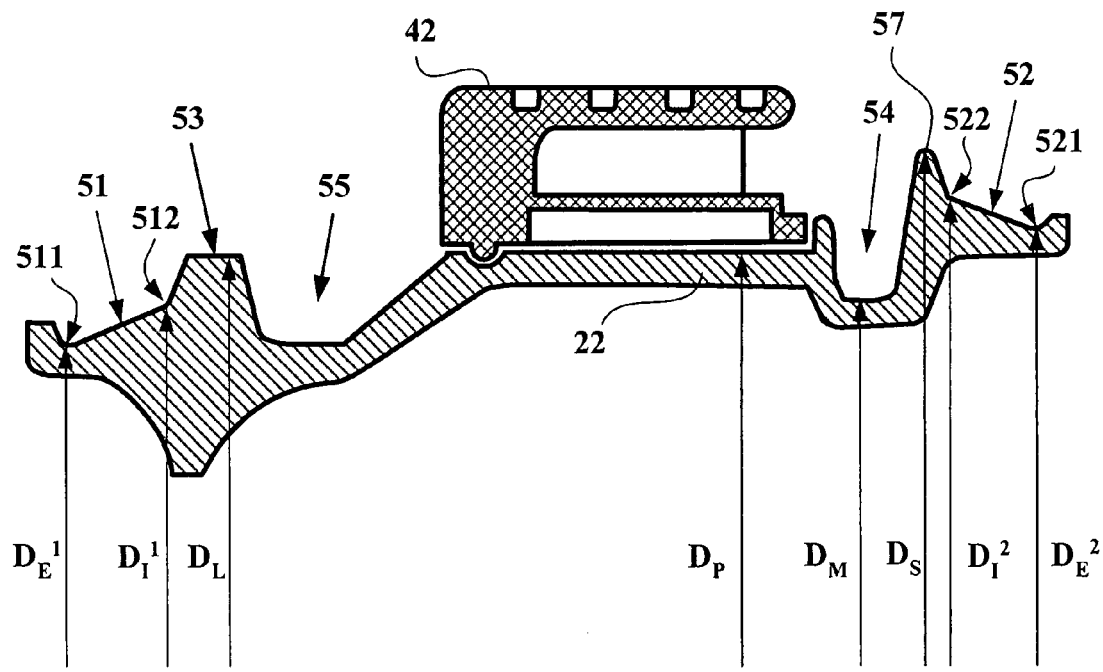
FIG. 3 - PRIOR ART
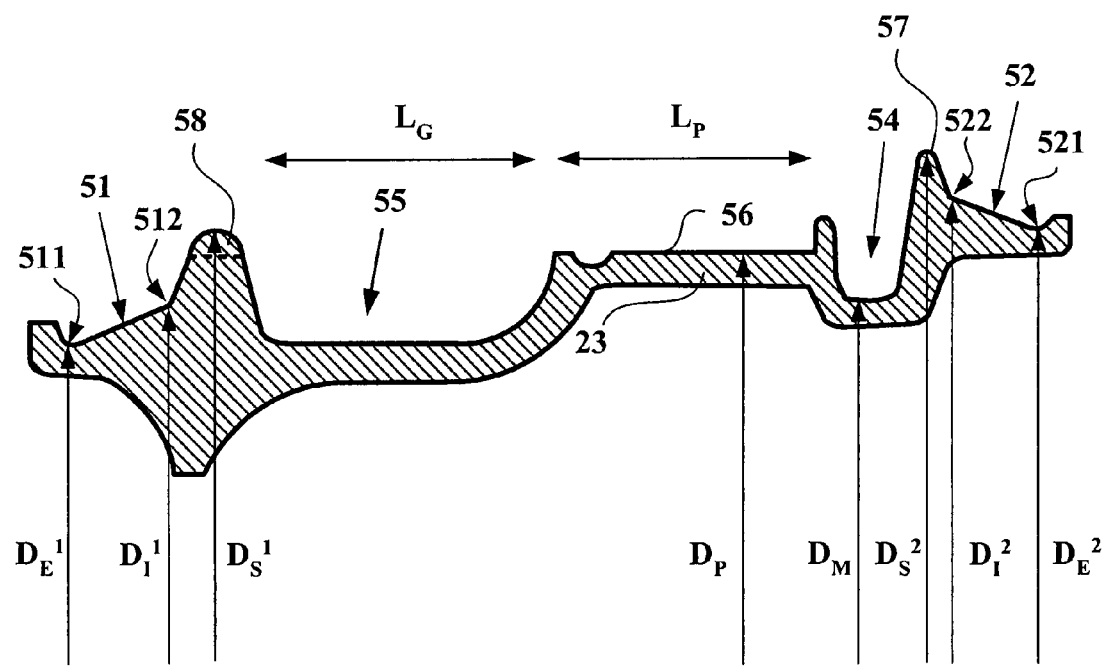
FIG. 4

FIG. 8 - PRIOR ART

VEHICLE RIM INTENDED FOR MOUNTING A TIRE AND A BEARING SUPPORT AND MOUNTING PROCESS FOR A TIRE/WHEEL ASSEMBLY PROVIDED WITH SUCH A RIM

The present application claims priority under 35 U.S.C. §119 and/or §365 to patent application Ser. No. 06/03538 filed in France on Apr. 21, 2006, and U.S. Provisional Application Ser. No. 60/809,790 filed on Jun. 1, 2006.

BACKGROUND OF THE INVENTION

1. Field of the Invention

The present invention relates to a vehicle rim, intended for mounting a tire and a bearing support capable of supporting the tire when the inflation pressure of the tire is low or even zero. It also relates to a tire/wheel assembly comprising such a rim and a process for mounting such a tire/wheel assembly.

2. Technical Background

Rims of this type are described, for example, in documents U.S. Pat. No. 5,787,950, U.S. Pat. No. 6,415,839 and WO 01/08905.

In the present description, an assembly comprising a wheel, a tire mounted on a wheel and a tread bearing support is designated by "tire/wheel assembly". The wheel comprises a rim and a disc.

In the tire/wheel assemblies of the field of the invention, the beads of the tire bear on seats of the rim and the mean diameters of the two seats are different in order to facilitate mounting and demounting of the bearing support on/from the rim.

The bearing support is born circumferentially by a supporting bearing surface of the rim, located between the two seats. It is formed for example from an elastically deformable elastomeric material, which prevents the tread from sagging when the tire/wheel assembly is operating in extended mode. "Rolling in extended mode" is understood to mean rolling of a tire the inflation pressure of which is abnormally low compared with the nominal pressure of use of the tire, the inflation pressure possibly even being zero.

The bearing support is mounted by sliding on axially, as described in detail in document US 2004/0074610. The different steps of mounting according to the prior art are illustrated in FIG. 8 below.

When a bead of the tire is under great stress, it may be induced to leave its bearing seat. According to whether it leaves its seat towards the inside of the rim (that is to say, to lodge in the space between the two seats) or towards the outside (that is to say, losing any contact with the rim), the term used will be "unseating" or "rolling off".

To evaluate the resistance of a rim to unseating, a tire/wheel assembly comprising this rim can be subjected to different tests when rolling in extended mode, in particular to a test at zero pressure. Automobile manufacturers generally demand that the resistance to unseating be demonstrated on a front train upon sustained emergency braking during sustained cornering.

Tests performed on the rim described in document WO 01/08905 have shown that this rim perfectly satisfies current manufacturers' demands in terms of resistance to unseating. The safety hump therefore suitably fulfils its role.

The inventors of the present invention carried out even more demanding rolling tests at zero pressure and noted that the bead, when subjected to very high forces in exceptional situations of the type when traveling on a circuit, may still become unseated. When a rim provided with a "ledge" (reference 53 of FIG. 3) and a weight reduction groove (reference 55 of FIG. 3) is used, the bead may cross the entire ledge and drop into the weight reduction groove.

SUMMARY OF THE INVENTION

The purpose of the invention is aimed at overcoming this difficulty and increasing the resistance which a rim intended for mounting a tire and increasing the resistance a bearing support may provide to unseating under extreme stresses.

This goal is achieved using a vehicle rim, of revolution, intended for mounting a tire and an annular bearing support capable of supporting a tread of the tire in the event of a loss of inflation pressure from the tire, this rim comprising:

- a first and a second rim seat, each of the rim seats being intended to receive a bead of the tire, each of the rim seats having a generatrix the axially inner end of which is on a circle of diameter $D_I$ greater than the diameter $D_E$ of the circle on which the axially outer end is located;
- a supporting bearing surface formed of at least one substantially cylindrical surface of revolution of mean diameter $D_P$ extending axially between the two seats and intended to be in close contact with the bearing support;
- a circumferential groove located axially between the supporting bearing surface and the first rim seat;
- wherein the first rim seat is delimited axially to the inside by a protrusion the external diameter $D_S$ of which is greater than the mean diameter $D_P$ of the supporting bearing surface, and in that the axial width of the circumferential groove located axially between the supporting bearing surface and said protrusion is adapted to enable the support to pass over said protrusion.

Since the external diameter $D_S$ of the protrusion is greater than the mean diameter of the bearing supporting surface, the protrusion will be able to resist axial unseating movement of a mounted tire therepast more effectively than prior art protrusions.

According to a preferred embodiment, the mean diameter of said first seat is less than the mean diameter of said second seat.

According to a preferred embodiment, the axial width of the circumferential groove located axially between the supporting bearing surface and the protrusion delimiting axially to the inside the seat of smaller diameter is equal to or greater than the axial width of the supporting bearing surface.

Preferably, the difference between the external diameter $D_S$ of said protrusion and the mean diameter $D_P$ of the supporting bearing surface is greater than 5 mm, and even more preferably greater than 10 mm.

The invention also relates to a wheel comprising a rim according to the invention and also a tire/wheel assembly comprising a tire, an annular bearing support and a wheel comprising a rim according to the invention.

Finally, the invention relates to a process for mounting a tire/wheel assembly comprising:

- a wheel comprising a disc and a rim according to the invention;
- a bearing support; and
- a tire having a first and a second bead intended to be mounted on the first and second rim seat respectively;

the process comprising the following steps:

(A) the bearing support is introduced into the tire;
(B) the second bead and the bearing support are presented on the rim, from the side of the first rim seat;
(C) the second bead is introduced on to the supporting bearing surface and the bearing support is engaged in the circumferential groove located axially between the supporting bearing surface and the first rim seat;
(D) the bearing support is slid onto the supporting bearing surface;
(E) the first bead is mounted on the first rim seat and the second bead on the second rim seat;

wherein the bearing support is engaged by inclining the axis of symmetry of the bearing support relative to the axis of symmetry of the rim so as to enable the bearing support to cross the protrusion delimiting the first rim seat.

By being able to position the bearing support in the circumferential groove, it is easier to mount the bearing support, and the profile of the rim can be designed to more strongly resist an unseating movement of a mounted tire.

BRIEF DESCRIPTION OF THE DRAWINGS

The invention will be better understood thanks to the description of the drawings, in which

FIG. 2 depicts diagrammatically, in meridian section, a tire/wheel assembly according to the prior art;

FIG. 3 depicts diagrammatically, in partial meridian section, a rim and a bearing support according to the prior art;

FIG. 4 is a view, similar to FIG. 3, of a first rim embodiment according to the invention;

DETAILED DESCRIPTION OF THE INVENTION

Figure 1:
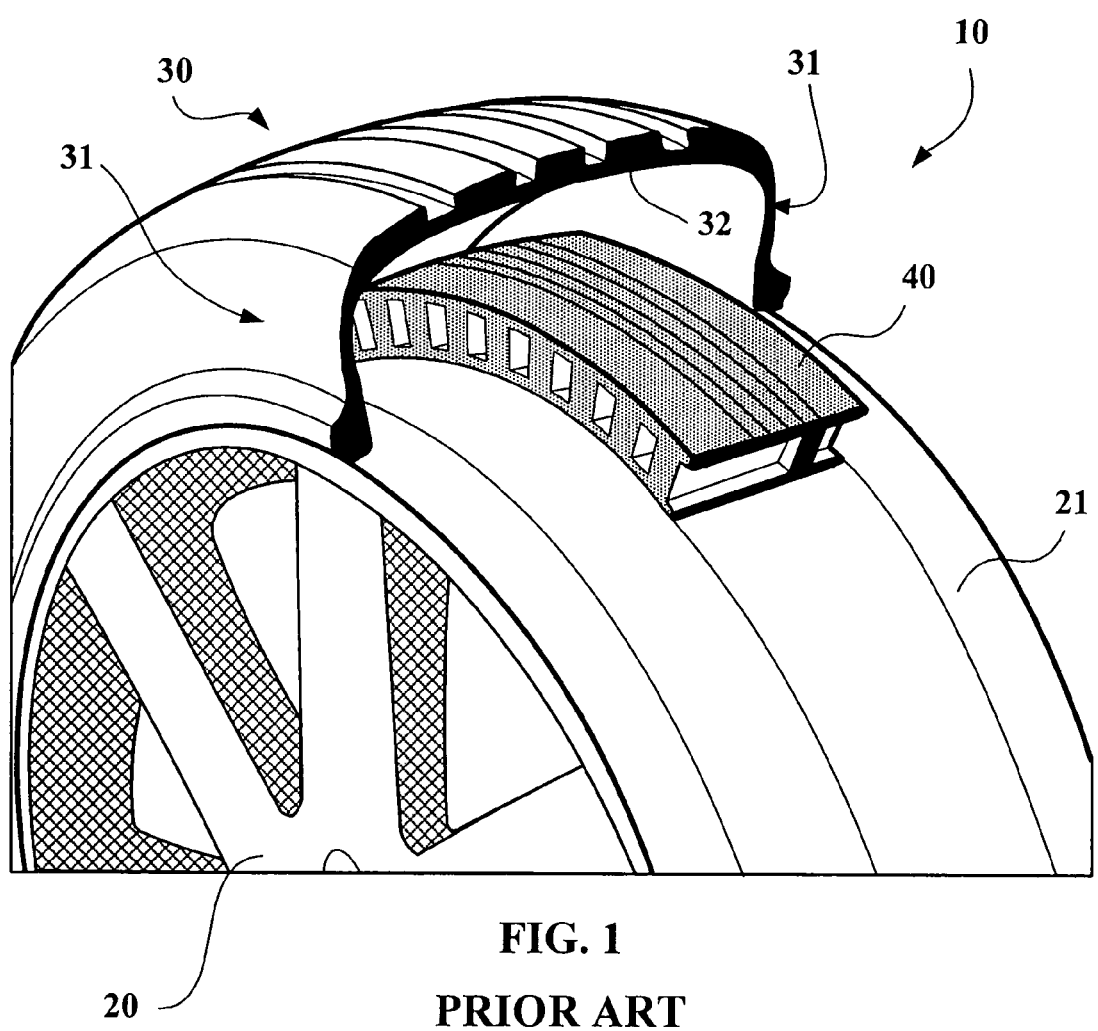
FIG. 1 depicts a partial perspective view of a tire/wheel assembly according to the prior art.

FIG. 1 depicts diagrammatically in perspective view a partial section of a tire/wheel assembly 10 of "PAX system" type comprising a wheel 20 with its rim 21, a tire 30 provided with sidewalls 31 and a crown 32, and a bearing support 40. When the tire deflates, for example following a puncture, the weight of the vehicle causes the sidewalls 31 to flex such that, in the proximity of the contact zone between the tire 30 and the roadway, the crown 32 comes into contact with the bearing ring 40.

As shown in FIG. 1, the bearing support 40 is not solid but has a complex geometry resulting from the measures taken to reduce the weight of the bearing ring 40 and, consequently, of the rolling assembly 10.

FIG. 2 depicts diagrammatically, in meridian section, a tire/wheel assembly of "PAX system" type comprising a wheel (formed of a rim 21 and a disc 22), a tire 30 and a bearing support 41. The axis of rotation 1 of the tire/wheel assembly is also indicated.

FIG. 3 depicts diagrammatically, in partial meridian section, a rim 22 and a bearing support 42 for a tire/wheel assembly of "PAX system" type. For the sake of clarity, the tire 30 is not shown. The rim 22 comprises two rim seats 51 and 52 of different mean diameters. Each of the rim seats 51 and 52 is intended to receive a bead of the tire. The generatrix of the rim seat 51 has an axially inner end 512 which is located on a circle of diameter $D_I^1$, $D_I^1$ being greater than the diameter $D_E^1$ of the circle on which the axially outer end 511 is located. Likewise, the generatrix of the rim seat 52 has an axially inner end 522 which is located on a circle of diameter $D_I^2$, $D_I^2$ being greater than the diameter $D_E^2$ of the circle on which the axially outer end 521 is located.

The rim 22 comprises a supporting bearing surface formed of a substantially cylindrical surface of revolution of mean diameter $D_P$ which extends axially between the two seats 51 and 52 and is in close contact with the bearing support 42.

The seat 52 is delimited axially to the inside by a protrusion 57, the external diameter $D_S$ of this protrusion 57 being significantly greater than the mean diameter $D_P$ of the supporting bearing surface.

The rim 22 also comprises a mounting groove 54 having an average diameter $D_M$ less than the mean diameter $D_P$ of the supporting bearing surface. The mounting groove 54 is located axially between the seat 52 and the supporting bearing surface; it is intended to permit mounting of the tire.

Finally, the rim 22 comprises a weight reduction groove 55 intended to reduce the weight of the rim.

The seat 51 is separated from the weight reduction groove 55 by what is commonly referred to as a "ledge" 53 formed of a substantially cylindrical surface of revolution of mean diameter $D_L$. In order to permit mounting of the bearing support 42 by sliding it on, the diameter of the ledge 53 is less than or equal to the diameter $D_P$ of the supporting bearing surface.

As has been stated further above, rolling tests at zero pressure have shown that unseating may occur when a tire/wheel assembly 10 such as the one shown in FIG. 3 is subjected to very high forces: the bead of the tire 30 may cross the entire ledge 53 and drop into the weight reduction groove 55. The invention relates to rims which make this movement impossible.

FIG. 4 depicts diagrammatically, in partial meridian section, such a rim 23 according to the invention. The ledge 53 has been replaced by a protrusion 58, the diameter $D_S^1$ of which is significantly greater than the diameter $D_P$ of the supporting bearing surface 56. In this case, the difference between the diameters $D_S^1$ and $D_P$ is 6 mm.

The rim 23 according to the invention comprises a circumferential groove 55 located axially between the supporting bearing surface and the protrusion 58 to permit the support to pass over said protrusion during mounting. The axial width $L_G$ of the circumferential groove 55 is adapted to allow the support to pass over said protrusion when mounting. In this case, the axial width $L_G$ is greater than the axial width $L_P$ of the supporting bearing surface.

Figure 5:
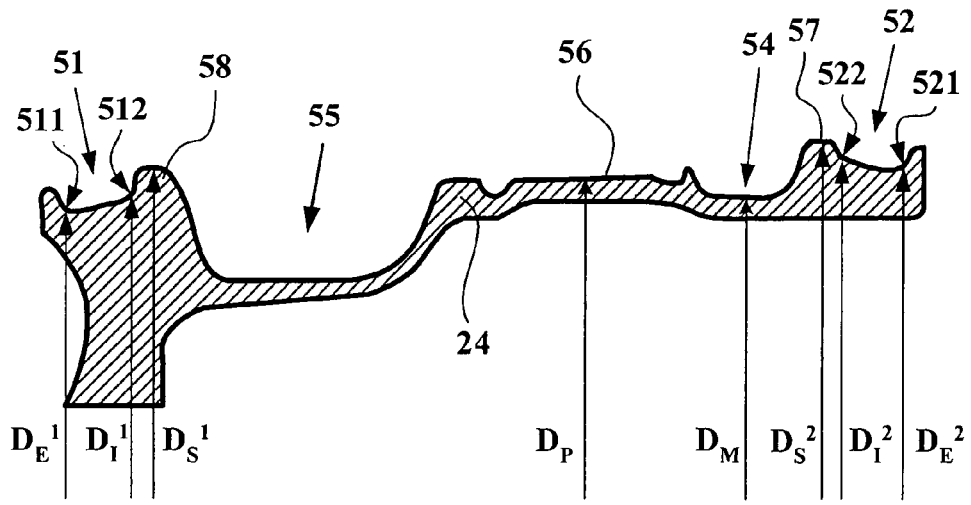
FIG. 5 is a view, similar to FIG. 3, of a second rim embodiment according to the invention.

FIG. 5 represents diagrammatically, in partial meridian section, another rim 24 according to the invention. The rim 24 has a geometry similar to that of the rim 23; in both cases in question, the mean diameter of the seat 51 close to the wheel disc 22 (FIG. 2) is less than the mean diameter of the seat 52. The bearing support will thus, as for the rim 22 according to the prior art, be mounted via the seat 51.

Figure 6:
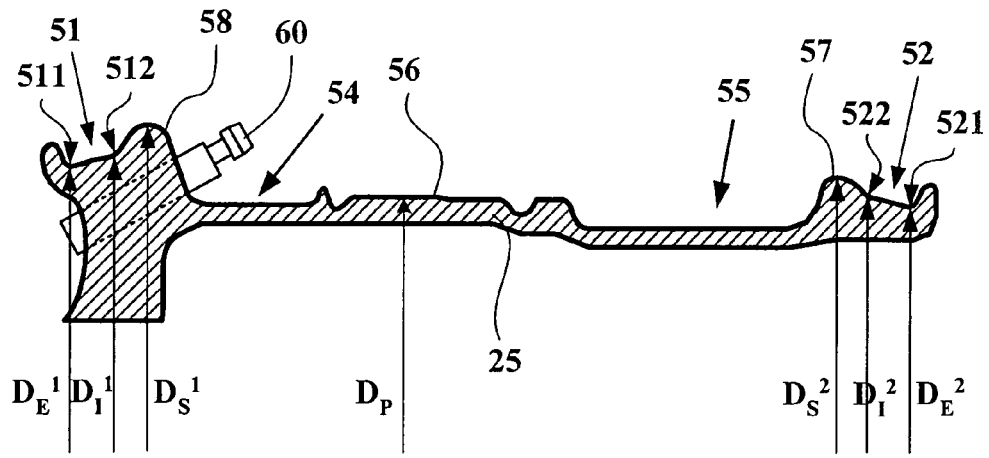
FIG. 6 is a view, similar to FIG. 3, of a third rim embodiment according to the invention.

FIG. 6 represents diagrammatically, in partial meridian section, a third rim 25 according to the invention. Unlike the rims 23 and 24, the mean diameter of the seat 51 close to the wheel disc 22 (FIG. 2) is greater than the mean diameter of the seat 52. The bearing support will thus be mounted via the seat 52. The rim 25 is also provided with a mounting groove 54 for passing the bead of larger diameter of the tire over the seat 51 from the inside towards the outside.

FIG. 6 furthermore shows the positioning of an inflation valve 60 relative to the rim 25.

Figure 7:
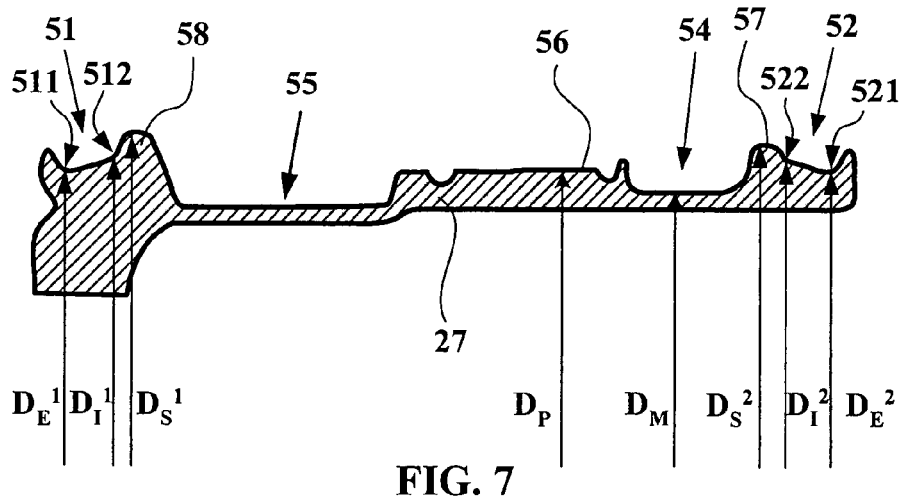
FIG. 7 is a view, similar to FIG. 3, of a fourth rim embodiment according to the invention.

FIG. 7 represents diagrammatically, in partial meridian section, a fourth rim 27 according to the invention. This rim is distinguished from the rims according to the invention of FIGS. 4 to 6 in that the mean diameter of the two seats 51 and 52 is identical. The bearing support is thus mounted via the seat adjacent to the groove 55 which is sufficiently wide to contain the bearing support when mounting.

Figure 8:
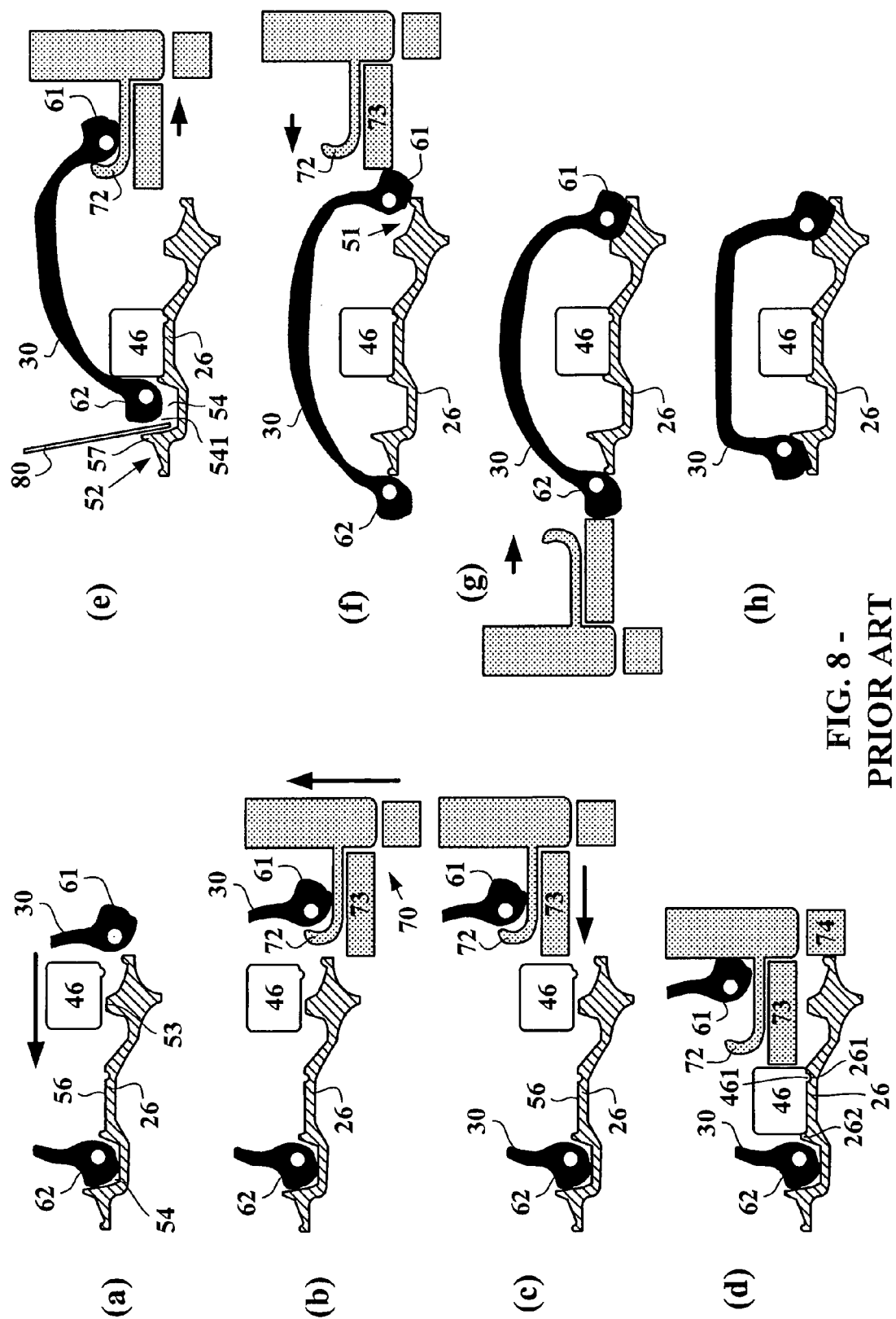
FIG. 8 illustrates the mounting process according to the prior art.

FIG. 8 illustrates diagrammatically the steps of a mounting process according to the prior art, in the case of a rim similar to that of FIG. 3, with a mounting groove 54 for mounting the tire 30. These figures illustrate the respective positions of the rim 26, the support 46 and the beads 61 and 62 of the tire 30, the rim being mounted on a horizontal rotary shaft. For the sake of simplicity, the tire 30 is only represented partially in FIGS. 8(a)-(d). The figures correspond to the respective positions in a vertical plane passing through the axis of rotation of the rim, above this axis.

The first step (not shown) is to introduce the support 46 into the tire 30. This introduction is described in U.S. Pat. No. 5,836,366 and illustrated in FIGS. 1A, 1B and IC of this patent. The introduction is effected after ovalization of the support and/or of the tire, or after puckering of the support.

Then the wheel is mounted on a rotary shaft, in this case horizontal, of an appropriate mounting machine, then an operator introduces the second bead 62 of the tire 30 and also the bearing support 46 onto the rim 26. The tire 30 and the support 46 are then in the position illustrated in FIG. 8(a): the second bead 62 is placed (at least in the zone illustrated) in the mounting groove 54, the support 46 is slid on around the ledge 53; the first bead 61 remains completely on the outside of the rim 26.

As illustrated in FIG. 8(b), a tool 70 is then moved beneath the first bead 61 to grip this first bead 61 with the hook 72 of the tool 70.

The tool 70 is then displaced vertically until the radially lower part of the roller 73 is above the supporting bearing surface 56. This position is illustrated in FIG. 8(c).

As indicated by the arrow of FIG. 8(c), the tool 70 is displaced axially in order to apply the pressure roller 73 directly against the face of the support 46 while causing the rim and, with it, the tire and the support to rotate. This makes it possible to slide the bearing support 46 gradually onto the supporting bearing surface 56. It may be noted that the bead 61 can freely retreat on the hook 72 during this positioning, which substantially reduces the bending stresses imposed on the crown of the tire 30.

FIG. 8(d) illustrates the end of the sliding of the support 46 over the bearing surface 56. The support buts against the protuberance 262 and the protuberance 461 of the support is engaged in the groove 261 of the bearing surface 56. In this position, the stop 74 of the tool 70 bears against the rim 26.

Once the support has finished being slid on to the bearing surface 56, the tool 70 is withdrawn axially until a traction is exerted on the bead 62 which lifts it slightly out of the bottom of the mounting groove 54 and clears a free space 541 between the bead 62 and the wall of the mounting groove adjacent to the protrusion 57 of the seat 52 (see FIG. 8(e)). It is then possible to insert a mounting lever 80 into this space in order to remove the bead 62 from the mounting groove 54 and to place it outside the seat 52 (see FIG. 8(f)).

Once the lever 80 has been inserted and the bead 62 disengaged from the mounting groove 54, the bead 61 is released from the hook 72 and the bead 61 is put in place on the first seat 51 by pressing the roller 73 against the bead 61 (see FIG. 8(f)) while rotating the rim.

Once the bead 61 has finished being mounted, the tool 70 is moved and turned over so as to be able to mount the bead 62 on its seat 52 by means of a push from the roller 73 while rotating the rim (see FIG. 8(g)).

The tire 30 and the support 46 are then fully in place on the rim 26 (FIG. 8(h)).

Figure 9:
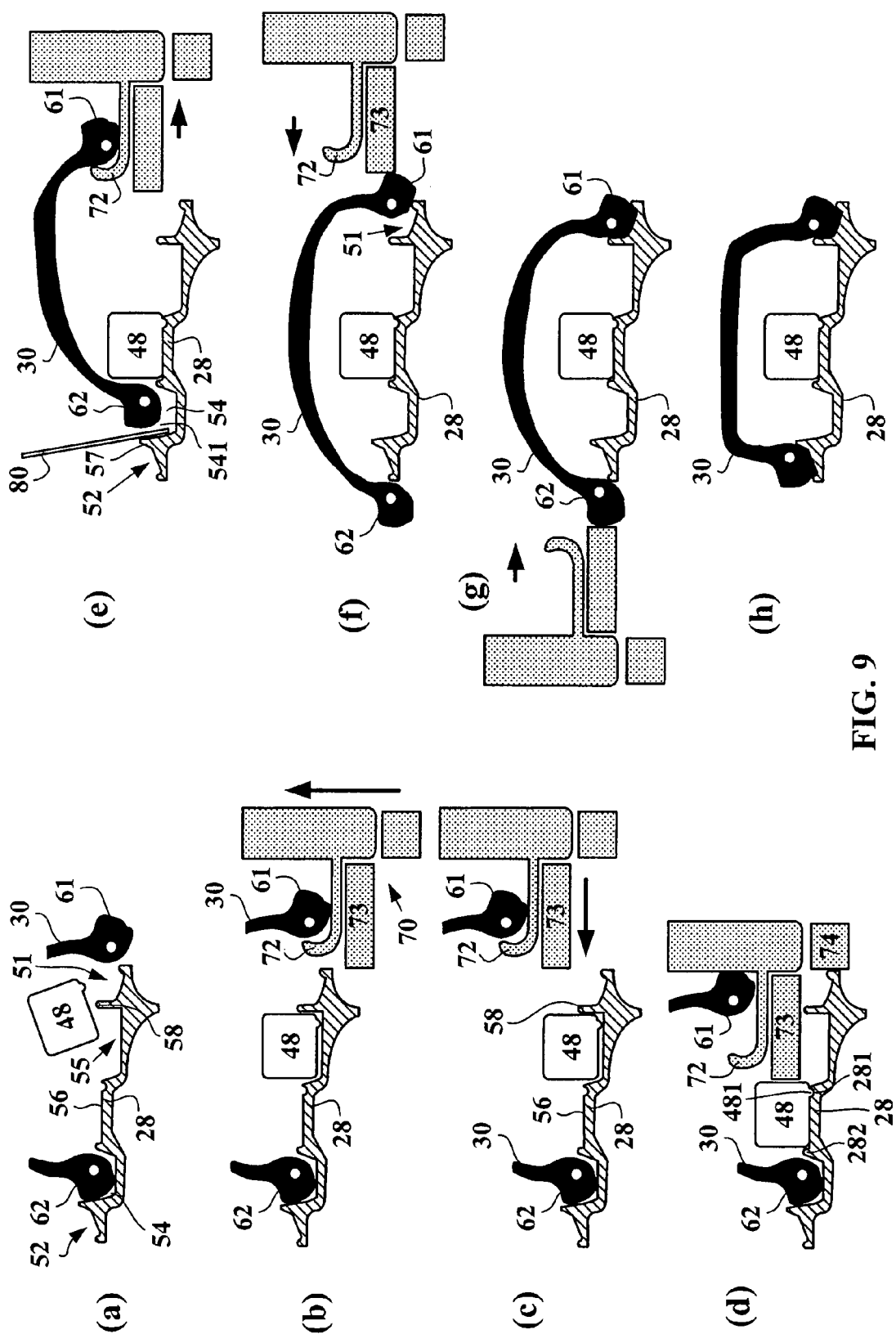
FIG. 9 illustrates the mounting process according to the invention.

FIG. 9 illustrates a preferred embodiment of the mounting process according to the invention. FIGS. 9(a) to (h) correspond to the respective positions of the rim 28, the support 48 and the beads 61 and 62 of the tire 30 in a vertical plane passing through the axis of rotation of the rim, above this axis.

As in the process according to the prior art, the first step (not shown) consists of introducing the support 48 into the tire 30. This introduction is described in U.S. Pat. No. 5,836,366 and illustrated in FIGS. 1A, 1B and 1C of this patent. The introduction is effected after ovalization of the support and/or of the tire, or after puckering of the support.

Then the wheel is mounted on a rotary shaft, in this case horizontal, of an appropriate mounting machine, then the second bead 62 of the tire 30 is introduced on to the supporting bearing surface 56, in this case by causing it to advance into the mounting groove 54 adjacent to the second rim seat 52.

Unlike the process according to the prior art, the protrusion 58 prevents the bearing support 48 from being simply slid on. The presence of the protrusion 58 thus makes it necessary to modify the mounting process. To surmount the protrusion 58, the axis of symmetry of the bearing support 48 is inclined relative to the axis of symmetry of the rim 26. This inclination enables the bearing support 48 to cross over the protrusion 58 in a fairly limited zone and to become embedded locally in the circumferential groove 55 located axially between the supporting bearing surface 56 and the first rim seat 51. In order to be able to receive the bearing support 48, the axial width of the groove 55 must be at least equal to the axial width of the bearing support 48.

Figure 10:
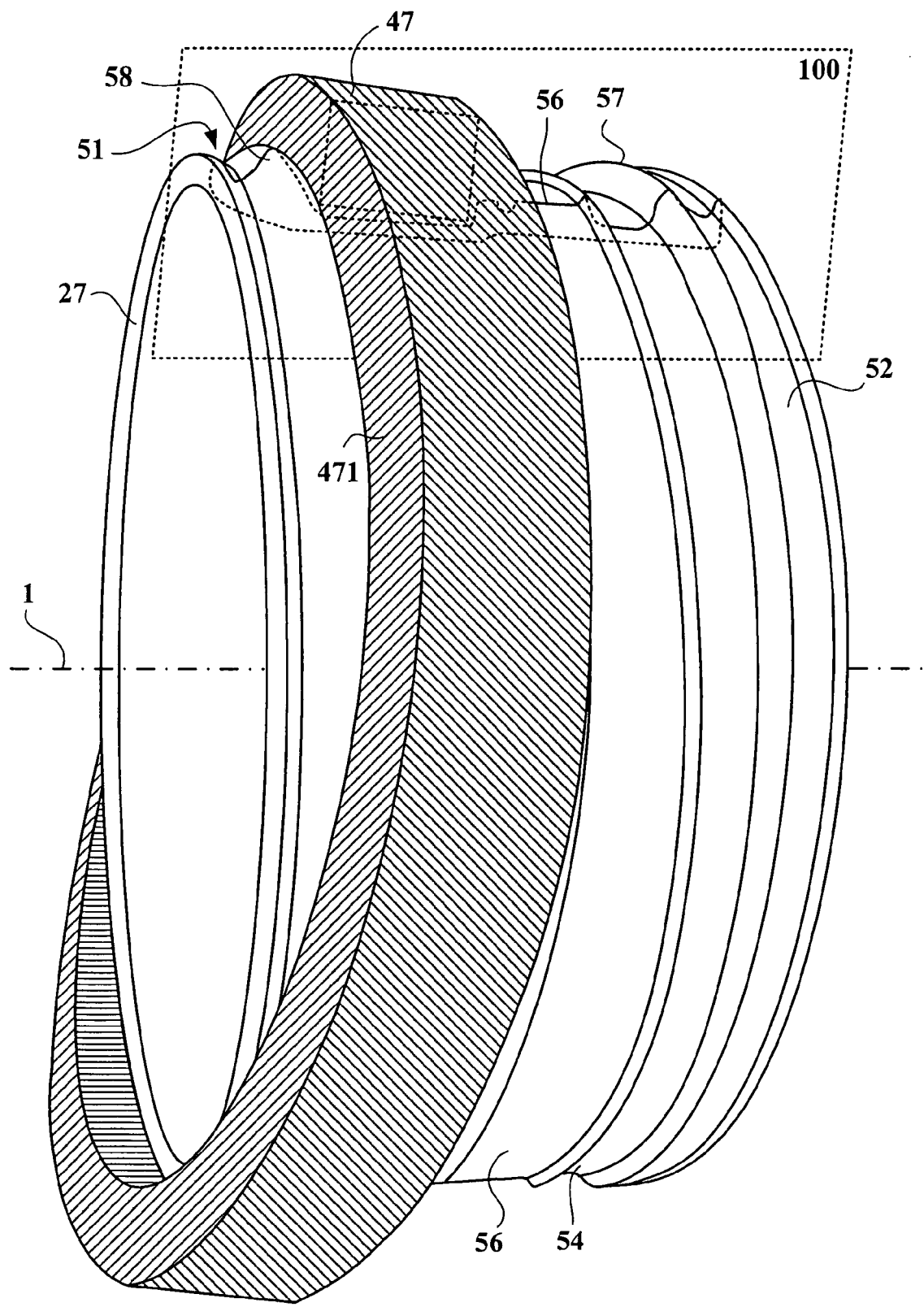
FIGS. 10 and 11 depict diagrammatically the relative location of the rim and the bearing support during different mounting steps.

FIG. 10 illustrates this stage of the process according to the invention. The bearing support 47 is engaged on the rim 27; in the zone around the section plane 100, the support 47 has crossed the protrusion 58 and has been introduced into the circumferential groove located axially between the supporting bearing surface 56 and the first rim seat 51. (The sections of the rim 27 and of the bearing support 47 in the section plane 100 are indicated in broken lines.) Outside this zone (and in particular at the bottom of FIG. 10) the bearing support 47 has not yet entirely crossed over the protrusion 58. FIG. 11(a) shows this same stage of the process according to the invention for another rim 29 according to the invention and a bearing support 49, in a front view (for the sake of clarity, the tire is not shown).

It is possible to force the support 47 to cross the protrusion over the entire circumference of the rim 27 by locally exerting a pressure against its lateral part 471, while causing the rim 27 to rotate. FIG. 11(b) shows the configuration of the rim 29 and the support 49 obtained after this operation. As the internal diameter of the bearing support 49 is greater than the mean diameter of the groove in which it is located, the axis of symmetry of the support 49 does not at this stage coincide with the axis of symmetry of the rim 29.

As illustrated in FIG. 9(b), a tool 70 is then moved beneath the first bead 61 to grip this first bead 61 with the hook 72 of the tool 70.

The tool 70 is then displaced vertically until the radially lower part of the roller 73 is above the protrusion 58. This position is illustrated in FIG. 9(c).

As indicated by the arrow of FIG. 9(c), the tool 70 is displaced axially in order to apply the pressure roller 73 directly against the face of the support 48 while causing the rim and, with it, the tire and the support to rotate. As the groove 55 is limited on the side of the second seat by a slope, the bearing ring 48 is gradually displaced upwards until the axis of symmetry of the support 48 coincides with the axis of symmetry of the rim 28. Then it is possible to slide the bearing support 48 gradually onto the supporting bearing surface 56.

Figure 11:
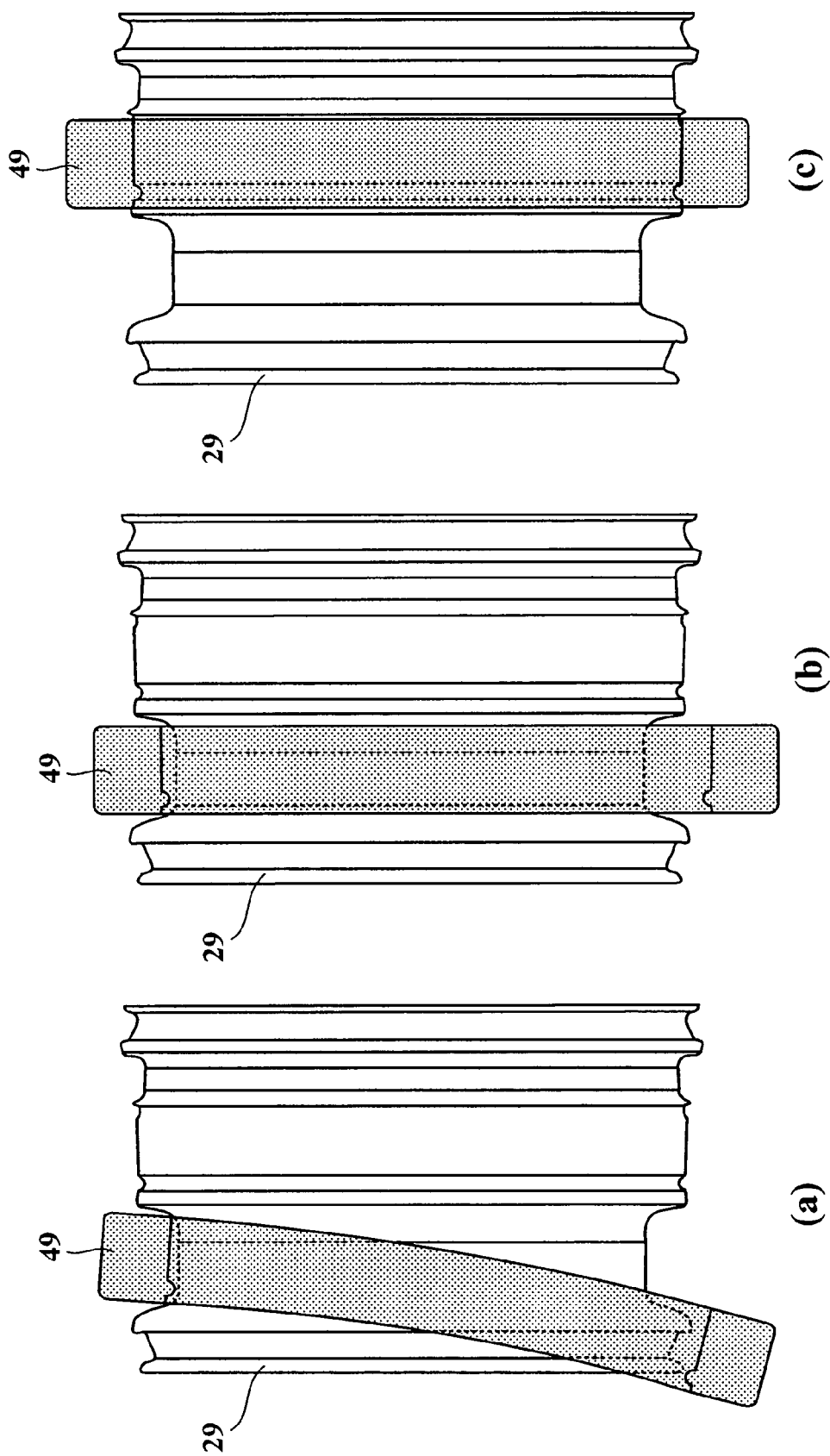

FIG. 9(*d*) illustrates the end of the sliding of the support 48 over the bearing surface 56. The support buts up against the protuberance 282 and the protuberance 481 of the support is locked into the groove 281 of the bearing surface 56. In this position, the stop 74 of the tool 70 bears against the rim 26. FIG. 11(*c*) shows the configuration of the rim 29 and the support 49 obtained after this operation.

The remaining steps of the process according to the invention (FIGS. 9(*e*) to (*h*)) are identical to the process according to the prior art.

What is claimed is:

1. A vehicle rim, of revolution, intended for mounting a tire and an annular bearing support capable of supporting a tread of the tire in the event of a loss of inflation pressure from the tire, the rim comprising:
   a first and a second rim seat, the mean diameter of said first rim seat being less than the mean diameter of said second rim seat, each of the rim seats being intended to receive a bead of the tire, each of the rim seats having a generatrix the axially inner end of which is on a circle of diameter $D_I$ greater than the diameter $D_E$ of the circle on which the axially outer end is located;
   a supporting bearing surface formed of at least one substantially cylindrical surface of revolution of mean diameter $D_P$ extending axially between the two seats and intended to be in close contact with the bearing support;
   a circumferential groove located axially between the supporting bearing surface and the first rim seat;
   wherein the first rim seat is delimited axially to the inside by a protrusion the external diameter $D_S$ of which is greater than the mean diameter $D_P$ of the supporting bearing surface, and wherein the axial width $L_G$ of the circumferential groove located axially between the supporting bearing surface and said protrusion is adapted to enable the support to pass over said protrusion;
   wherein the axial width $L_G$ of the circumferential groove located axially between the supporting bearing surface and the protrusion delimiting axially to the inside the seat of smaller diameter is equal to or greater than the axial width $L_P$ of the supporting bearing surface.

2. The rim of claim 1, wherein the difference between the external diameter of said protrusion and the mean diameter $D_P$ of the supporting bearing surface is greater than 5 mm.

3. A wheel comprising the rim of claim 1.

4. A tire/wheel assembly comprising a tire, an annular bearing support and the wheel of claim 3.

5. A process for mounting a tire/wheel assembly comprising:
   a wheel comprising a disc and a rim according to either one of claims 1 or 4;
   a bearing support; and
   a tire having a first and a second bead intended to be mounted on the first and second rim seat respectively;
   the process comprising the following steps:
   (A) the bearing support is introduced into the tire;
   (B) the second bead and the bearing support are presented on the rim, from the side of the first rim seat;
   (C) the second bead is introduced on to the supporting bearing surface and the bearing support is engaged in the circumferential groove located axially between the supporting bearing surface and the first rim seat;
   (D) the bearing support is slid onto the supporting bearing surface;
   (E) the first bead is mounted on the first rim seat and the second bead on the second rim seat;
   wherein the bearing support is engaged by inclining the axis of symmetry of the bearing support relative to the axis of symmetry of the rim so as to enable the bearing support to cross the protrusion delimiting the first rim seat.

* * * * *